United States Patent [19]

Hurps et al.

[11] Patent Number: 4,559,367
[45] Date of Patent: Dec. 17, 1985

[54] COMBINATION BLOWING AGENT AND FILLER FOR THERMOPLASTIC FOAMS

[75] Inventors: Richard L. Hurps, Newark; Kyung W. Suh, Granville, both of Ohio

[73] Assignee: The Dow Chemical Company, Midland, Mich.

[21] Appl. No.: 722,485

[22] Filed: Apr. 12, 1985

[51] Int. Cl.$^4$ .............................. C08J 9/12; C08J 9/14
[52] U.S. Cl. ........................................ 521/79; 264/53; 264/DIG. 5; 264/DIG. 13; 521/84.1; 521/146; 521/910
[58] Field of Search .................. 264/53; 521/79, 84.1, 521/146, 910

[56] References Cited

U.S. PATENT DOCUMENTS

| | | | |
|---|---|---|---|
| 2,386,995 | 2/1942 | Wigal | 260/36 |
| 2,911,382 | 11/1959 | Barkhuff | 260/2.5 |
| 4,278,767 | 7/1981 | DiGiulio et al. | 521/88 |
| 4,455,272 | 6/1984 | Schubert et al. | 264/53 |

FOREIGN PATENT DOCUMENTS 844652  6/1970  Canada.

Primary Examiner—Morton Foelak
Attorney, Agent, or Firm—Thomas J. Mielke

[57] ABSTRACT

A process for the preparation of an alkenyl aromatic polymeric foam body. The process comprising using water-containing organic vegetable matter as a blowing agent in combination with a volatile fluid foaming agent.

17 Claims, 1 Drawing Figure

COMBINATION BLOWING AGENT AND FILLER FOR THERMOPLASTIC FOAMS

BACKGROUND OF THE INVENTION

This invention relates to an improved process for forming a thermoplastic foam body from an alkenyl aromatic polymeric material. Specifically, it relates to a process for forming a thermoplastic foam using finely-divided, water-containing organic vegetable matter as a blowing agent.

Thermoplastic foams are widely used in the area of thermal insulation. Of particular interest in this area are the styrene polymer foams. Thermoplastic foam material suitable for use in the thermal insulation field are desirably extruded foams having a generally uniform cell size.

Methods for producing extruded thermoplastic foamed material are well-known in the prior art. Typically, the steps of such methods comprise: (1) heat plastifying the alkenyl aromatic polymeric material to be foamed; (2) adding to the heat plastified polymeric material, while said polymeric material is under a pressure sufficient to prevent foaming, a volatile fluid foaming agent; and (3) extruding the foaming agent/polymeric material mixture into a zone of lower pressure to thereby cause the formation of a foam through volatilization of the foaming agent.

Exemplary of such methods are U.S. Pat. Nos. 2,409,910; 2,525,250; 2,699,751; 2,848,428; 2,928,130; 3,121,130; 3,121,911; 3,770,688; 3,815,674; 3,960,792; 3,966,381; 4,085,073; and 4,146,563; the teachings of which are herein incorporated by reference thereto.

One particularly desirable method for producing a stable styrene polymer foam is set forth in U.S. Pat. No. 3,960,792 to M. Nakamura. Nakamura describes a method of producing a styrenic polymer foam using a blowing agent mixture of methyl chloride and a chlorofluorocarbon.

While methods employing methyl chloride as a blowing agent produce foams having physical characteristics which are highly desirable for thermal insulation, the use of methyl chloride is undesirable in several aspects. Due to the stringent industrial hygiene requirements associated with methyl chloride, foams in which methyl chloride has been used as a blowing agent must be aged for a period of time sufficient to permit the methyl chloride to leave the cells and air to enter by an appropriate diffusion process through the cell walls. Obviously, the length of time the foamed material must be aged is dependent on the thickness of the foamed material. In those situations in which a relatively thick sheet of foamed material is produced, the necessity of a relatively lengthy aging period can present an inconvenient warehousing problem.

Due to the above-described disadvantages inherent in the use of methyl chloride as a blowing agent, much work has been done in an effort to find a blowing agent or blowing agents which will produce foams, having desirable physical characteristics but which will not have the above-described problems.

In U.S. Pat. No. 2,911,382, water is employed as a blowing agent wherein the water is provided in the form of a hydrated salt which decomposes, at an elevated temperature, to liberate water; U.S. Pat. No. 2,386,995 teaches expanding vinyl esters and polystyrene with plasticizing and any suitable blowing agent including water; Canadian Pat. No. 844,652 teaches the preparation of a foam forming styrene-acrylic acid copolymer wherein water is utilized as a blowing agent; U.S. Pat. No. 4,278,767 teaches a fire retardant styrene copolymer foam prepared by the direct injection of water as a blowing agent.

Finally, U.S. Pat. No. 4,455,272 teaches the formation of a polystyrene foam employing a blowing agent comprising a mixture of a volatile fluid blowing agent and water. Suitable volatile fluid blowing agents include propane, normal- and isobutane, the pentanes, and hexanes, and halogenated hydrocarbons such as trichlorofluoromethane, and dichlorodifluoromethane. The foams of U.S. Pat. No. 4,455,272 have desirable physical properties and avoid the problems associated with the use of methyl chloride as a blowing agent.

Nonetheless, the process taught by U.S. Pat. No. 4,455,272, and other such patents employing water as a blowing agent, have proven unsatisfactory in a number of aspects. The amount of water suitable for use as a blowing agent is limited to approximately that amount which is soluble in the polymeric material from which the foam will be formed. In the case of producing a polystyrene foam, the amount of water which can be dissolved in the polystyrene is small, more importantly, it is less than the desired optimal amount. Inclusion of an amount of water greater than that amount which will dissolve in the polystyrene leads to phase separation of the water and polystyrene. This phase separation results in a polystyrene foam product having unacceptable physical appearance and characteristics.

Until now, no method was known for incorporating into the polystyrene an amount of water greater than that amount which is soluble therein. It is desirable to find a way to employ more water than that amount which is soluble in the polystyrene and still produce a foam with acceptable appearance and physical characteristics.

Moreover, the prior methods have proven unsatisfactory in producing highly filled foam material. This is because of the difficulty encountered in extruding such highly filled materials. It is desirable to find a process suitable for producing highly filled thermoplastic foam material.

Additionally, when the foam material is to be used as thermal insulation it is desirable to produce a foam possessing good structural strength and high thermal insulation value.

It is to these goals that the present invention is directed.

SUMMARY OF THE INVENTION

The present invention concerns a process for the preparation of an alkenyl aromatic polymeric foam body, the steps of the method comprising:

(1) heat plastifying an alkenyl aromatic polymeric material;

(2) adding to the heat plastified polymeric material, under a pressure sufficient to prevent foaming, a volatile fluid foaming agent and an amount of finely-divided, water-containing organic vegetable matter, to provide a foaming agent/polymeric material mixture;

(3) mixing the volatile fluid foaming agent and the finely-divided, water-containing organic vegetable matter with the heat plastified polymeric material to form a blowable mixture;

(4) reducing the temperature of the blowable mixture to a temperature such that when the pressure is reduced thereon, an alkenyl aromatic polymeric foam of desirable qualities is formed; and (5) extruding the blowable mixture into a zone of lower pressure to thereby cause the blowable mixture to form a foam of desirable qualities.

Also within the scope of the present invention is the composition prepared by the above process.

DETAILED DESCRIPTION OF THE INVENTION

Figure 1:
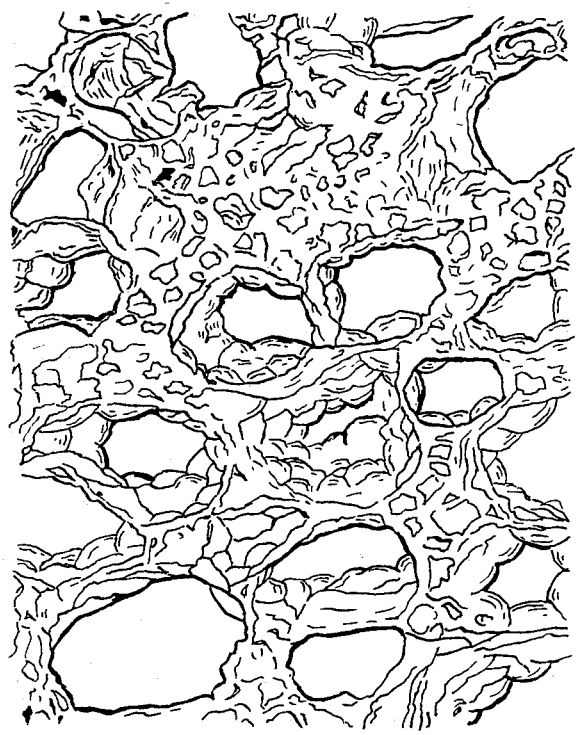

By the term "alkenyl aromatic polymeric materials" is meant a solid polymer of one or more polymerizable alkenyl aromatic compounds. The polymer or copolymer comprises, in chemically combined form, at least 50 percent by weight of at least one alkenyl aromatic compound having the general formula

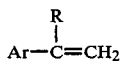

wherein Ar represents an aromatic hydrocarbon radical, or an aromatic halohydrocarbon radical of the benzene series, and R is hydrogen or the methyl radical. Exemplary of such alkenyl aromatic polymeric materials are the solid homopolymers of styrene, α-methylstyrene, o-methylstyrene, m-methylstyrene, p-methylstyrene, ar-ethylstyrene, ar-vinylxylene, ar-chlorostyrene, or ar-bromostyrene; the solid copolymers of two or more such alkenyl aromatic compounds with minor amounts of other readily polymerizable olefinic compounds such as methyl methacrylate, acrylonitrile, maleic anhydride, citraconic anhydride, itaconic anhydride, acrylic acid, rubber reinforced (either natural or synthetic) styrene polymers, etc.

The alkenyl aromatic polymeric materials of the present invention suitably have a weight average molecular weight of from about 100,000 to about 350,000, as determined by gel permeation chromatography.

In the case wherein the alkenyl aromatic polymeric material comprises a copolymer of styrene and acrylic acid, the acrylic acid is present in the copolymer in an amount of from about 0.5 to about 30, preferably from about 0.5 to about 20 weight percent based on total copolymer weight.

The process of the present invention employs at least two different blowing agents. One of the blowing agents is a finely-divided, water-containing organic vegetable matter, the other is a volatile fluid foaming agent.

Volatile fluid foaming agents suitable for use in the present invention are well-known in the prior art. Exemplary of such volatile fluid foaming agents are ethyl chloride and the volatile fluid fluorocarbons boiling at or below 100° C. The volatile fluid fluoro-carbons are particularly desirable in the practice of the present invention. Exemplary of desirable volatile fluid fluorocarbons are perfluoromethane, chlorotri-fluoromethane, dichlorodifluoromethane, trichloro-fluoromethane, perfluoroethane, 1-chloro-1,1-difluoro-ethane, chloropentafluoroethane, dichlorotetrafluoroethane, trichlorotrifluoroethane, perfluoropropane, chloroheptafluoropropane, dichlorohexafluoropropane, perfluorobutane, chlorononafluorobutane, and perfluorocyclobutane. The preferred volatile fluid fluorocarbon is dichlorodifluoromethane.

The volatile fluid foaming agent is employed in the practice of the present invention in an amount of from about 1 to about 30 parts per hundred parts of alkenyl aromatic polymeric material. Preferably, the volatile fluid foaming agent is employed in the practice of the present invention in an amount of from about 3 to about 25 parts per hundred parts of alkenyl aromatic polymeric material.

A variety of materials are suitable for use as the water-containing organic vegetable matter. Suitably such material is inexpensive and capable of being relatively finely divided. Exemplary of suitable water-containing organic vegetable matter are corn cobs, soy beans, potatoes, wood, rice, cotton, etc. For reasons of cost, ease of handling and ready availability, corn cobs are the preferred water-containing organic vegetable matter.

Typically the finely-divided, water-containing organic vegetable matter is employed in the practice of the present invention in an amount of from about 0.5 to about 20 weight percent based on total weight of the alkenyl aromatic polymeric material. Preferably, the finely-divided, water-containing organic vegetable matter is employed in the practice of the present invention in an amount of from about 1 to about 15 weight percent based on total weight of the alkenyl aromatic polymeric material.

The finely-divided, water-containing organic vegetable matter suitably contains water in an amount of from about 1 to about 100 weight percent preferably, from about 3 to about 30 weight percent based on total weight of finely-divided, water-containing organic vegetable matter. The amount of finely-divided, water-containing organic vegetable matter present in the alkenyl aromatic polymeric material is dependent on the amount of water contained therein. For example, the higher the water content of the finely-divided, water-containing organic vegetable matter, the lower the amount that must be present in the alkenyl aromatic polymeric material. The converse is also true. The amount and water content of the finely-divided, water-containing organic vegetable matter is chosen so that from about 0.1 to about 4.5 weight percent preferably, from about 0.25 to about 4.0 weight percent water is added to the alkenyl aromatic polymeric material.

Suitably, the finely-divided, water-containing organic vegetable matter has a particle diameter ranging from about 0.05 to about 0.5 millimeters preferably, from about 0.07 to about 0.5 millimeters.

Desirably, the water-containing organic vegetable matter is present in an amount sufficient to provide a foamed body having a plurality of closed non-interconnecting gas-containing primary cells, said primary cells being formed of a plurality of walls and struts, the struts being at the juncture of the adjacent cell walls, a portion of said walls and struts having secondary cells formed therein.

The Figure illustrates a polystyrene foam according to the present invention wherein the water-containing organic vegetable matter caused the formation of the above-described desirable primary, secondary cell structure.

The finely-divided, water-containing organic vegetable matter is present in the process of the present invention in an amount sufficient to act as an extrusion aid in those instances where extrusion is a problem due to the highly filled nature of the alkenyl aromatic polymeric foam bodies.

In one preferred embodiment of the present invention, the water-containing organic vegetable matter is finely divided corn cobs. In this preferred embodiment the corn cobs have a water content of about 8 weight percent based on total corn cob weight, a particle diameter of about 0.15 millimeters, and are added to the alkenyl aromatic polymeric material in an amount of about 10 parts per hundred parts of alkenyl aromatic polymeric material.

Generally, the preparation of the alkenyl aromatic polymeric foam body in accordance with the present invention is done in a manner substantially as shown and described in U.S. Pat. No. 2,669,751. In the process, the alkenyl aromatic polymeric material and the finely-divided, water-containing organic vegetable matter are fed into an extruder. Within the extruder, the alkenyl aromatic polymeric material is heat plastified and intimately admixed with the finely divided water-containing organic vegetable matter. The volatile fluid foaming agent is injected, within the extruder, into the intimate admixture of heat plastified alkenyl aromatic polymeric material and finely divided water-containing organic vegetable matter. The mixture of heat plastified alkenyl aromatic polymeric material, finely-divided, water-containing organic vegetable matter, and volatile fluid foaming agent exits the extruder and is passed into a mixer. The mixer is a rotary mixer wherein a studded rotor is enclosed within a housing which has a studded internal surface which intermeshes with the studs on the rotor. The mixture from the extruder is fed into the inlet end of the mixer and is discharged from the outlet end, the flow being in a generally axial direction. From the mixer, the mixture passes through coolers such as those described in U.S. Pat. No. 2,669,751 and from the coolers to a die which extrudes a generally rectangular board.

A generally similar extrusion system and a preferred extrusion system is shown in U.S. Pat. No. 3,966,381. As will be appreciated by those skilled in the art, the above-described process is capable of many modifications without departing from the spirit of the present invention. For example, in some instances it may be desirable to inject some unbound water into the mixture of heat plastified alkenyl aromatic polymeric material and finely-divided, water-containing organic vegetable matter along with the volatile fluid foaming agent.

In the preparation of foams in accordance with the present invention, it is often desirable to add a nucleating agent to reduce the primary cell size. Suitable nucleating agents include talc, calcium silicate, indigo, and the like.

Various other additives may also be utilized, such as fire retardant chemicals, stabilizers, and the like.

The foams produced by the process of the present invention desirably comprise a plurality of closed non-interconnecting gas-containing primary cells, the primary cells being formed of a plurality of walls and struts, the struts being at the juncture of adjacent cell walls, a portion of said walls and struts having secondary cell formed therein. The primary cells suitably have a diameter of from about 0.05 to about 3.0 millimeters preferably, from about 0.1 to about 2.5 millimeters. The secondary cells suitably have a cell diameter ranging in size from about 5 to about 35, preferably from about 15 to about 25 percent of the diameter of the primary cells. Additionally, the foam bodies produced by the process according to the present invention have a density of from about 1 to about 5 pounds per cubic foot.

Moreover, foam produced by the process of the present invention possess improved structural strength and thermal insulation value. Additionally the foam material is economical to produce.

The following examples are illustrative in purpose only, and are not intended to limit, in any manner, the scope of the invention as set forth in the claims.

In the following examples, all parts given are parts by weight unless otherwise noted.

EXAMPLE 1

A styrene polymer foam was prepared utilizing a 2 ½ inch diameter extruder which fed a rotary mixer generally as a configuration disclosed in U.S. Pat. No. 2,669,751. A rotary mixer discharge was passed through heat exchangers of the variety shown in U.S. Pat. No. 3,014,702. The discharge from the heat exchangers was in turn passed through a plurality of interfacial surface generators or static mixers of the type shown in U.S. Pat. No. 3,583,678. The discharge from the static mixers was passed to a slot die. The following formulation was employed: 100 parts by weight of polystyrene having a weight average molecular weight of about 200,000; about 0.1 parts per hundred of barium stearate; 1.2 parts per hundred of hexabromocyclododecane; about 0.15 parts per hundred of a 10 percent phthalocyanine blue polystyrene concentrate; about 8 parts per hundred of dichlorodifluoro-methane; and 5 weight percent, based on total weight of the extruded material, of finely-divided corn cobs commercially available from the Anderson Corn Cob Company of Maumee, Ohio, under the trade designation LITRE COB. The foaming temperature was about 132° C. The styrene polymer foam was extruded at a rate of about 200 pounds per hour. The foam had a cross section of 1 inch by 8 inches and a density of 2.19 pounds per cubic foot. Other physical properties of the foam are set forth in Table I.

EXAMPLE 2

The procedure of Example 1 was repeated. The foam produced had a density of 2.35 pounds per cubic foot. Other physical properties of the foam are set forth in Table I.

EXAMPLE 3

The procedure on Example 1 was repeated. The resultant foam had a density of 2.70 pounds per cubic foot. Other physical properties of the foam are set forth in Table I.

EXAMPLE 4

The general procedure of Example 1 was repeated with the exception that 10 weight percent, based on total weight of material to be extruded, of the above described LITRE COB was included in the formulation. The foam produced had a density of 1.97 pounds per cubic foot. Additional physical properties of the foam were set forth in Table I.

EXAMPLE 5

The general procedure of Example 1 was repeated with the exception that 10 weight percent, based on total weight of material to be extruded, of the above-described LITRE COB was included in the formulation. The resulting foam had a density of 2.09 pounds per cubic foot. Additional physical properties of the polystyrene foam are set forth in Table I.

TABLE I

| Example Number | Corncobs[1] | Foam Density[2] | Vertical Cell Size[3] | Compressive strength[4] | | | K-Factor[8] | |
|---|---|---|---|---|---|---|---|---|
| | | | | Vert.[5] | Horiz.[6] | Ext.[7] | measured[9] | normalized[10] |
| 1 | 5 | 2.19 | 0.51 | 29.0 | 22.2 | 25.4 | 0.180 | 0.172 |
| 2 | 5 | 2.35 | 0.45 | 32.1 | 27.8 | 26.3 | 0.185 | 0.185 |
| 3 | 5 | 2.70 | 0.67 | 15.5 | 43.8 | 57.0 | 0.193 | 0.180 |
| 4 | 10 | 1.97 | 0.45 | 30.0 | 16.7 | 15.0 | 0.186 | 0.177 |
| 5 | 10 | 2.09 | 0.37 | 33.3 | 20.0 | 19.8 | 0.183 | 0.183 |

[1] Weight percent, based on total weight of material to be extruded, of finely divided corn cob commercially available from the Anderson Corn Cob Company of Maumee, Ohio, under the commercial designation "LITRE COB."
[2] Measured without skin in pounds per cubic foot.
[3] In millimeters
[4] Measured without significant aging of the foam, expressed in pounds per square inch.
[5] Measured in the vertical (thickness) direction.
[6] Measured in the horizontal (width) direction.
[7] Measured in the extrusion (longitudinal) direction.
[8] In British Thermal Units by inches per square foot by hours by degrees Fahrenheit.
[9] After curing foams for 6 weeks at 65° C.
[10] Normalized to a density of 2.0 pounds per cubic foot and a vertical cell size of 0.35 millimeters.

As is apparent from the foregoing specification, the present invention is susceptible of being embodied with various alterations and modifications which may differ particularly from those that have been described in the preceding specification and description. For this reason, it is to be fully understood that all of the foregoing is intended to merely illustrative and is not to be construed or interpreted as being restrictive or otherwise limiting of the present invention, excepting as it is set forth and defined in the following claims.

What is claimed is:

1. A process for the preparation of an alkenyl aromatic polymeric foam body, the steps of the method comprising:
   (1) heat plastifying an alkenyl aromatic polymeric material;
   (2) adding to the heat plastified polymeric material, under a pressure sufficient to prevent foaming, a volatile organic fluid foaming agent and an amount of finely-divided, water-containing organic vegetable matter, to provide a foaming agent/polymeric material, mixture;
   (3) mixing the volatile organic fluid foaming agent and the finely-divided, water-containing organic vegetable matter with the heat plastified polymeric material to form a blowable mixture;
   (4) reducing the temperature of the blowable mixture to a temperature such that when the pressure is reduced thereon, an alkenyl aromatic polymeric foam of desirable quality is formed; and
   (5) extruding the blowable mixture into a zone of lower pressure to thereby cause the blowable mixture to form a foam of desirable quality.

2. The process of claim 1 wherein the alkenyl aromatic polymeric material is polystyrene.

3. The process of claim 1 wherein the alkenyl aromatic polymeric material is a copolymer of styrene/acrylic acid.

4. The process of claim 1 wherein the alkenyl aromatic polymeric material is heat-plastified in an extruder.

5. The process of claim 4 wherein the finely-divided, water-containing organic vegetable matter is incorporated into the heat-plastified alkenyl aromatic polymeric material in the extruder.

6. The process of claim 1 wherein the volatile organic fluid foaming agent is a fluorocarbon.

7. The process of claim 6 wherein the fluorocarbon is present in an amount of from about 3 to about 25 parts per hundred parts alkenyl aromatic polymeric material.

8. The process of claim 7 wherein the fluorocarbon is difluorodichloromethane.

9. The process of claim 1 wherein the alkenyl aromatic foam body has a plurality of closed, non-interconnecting, gas-containing primary cells, said primary cells being formed of a plurality of walls and struts, the struts being at the juncture of adjacent cell walls, a position of said walls and struts having secondary cells formed therein.

10. The process of claim 9 wherein the primary cells have a diameter within the range of from about 0.05 to about 3.0 millimeters.

11. The process of claim 10 wherein the secondary cells have a diameter within the range of from about 5 to about 35 percent of the diameter of the primary cells.

12. The process of claim 1 wherein the water-containing organic vegetable matter is finely divided corn cob.

13. The process of claim 12 wherein the corn cobs contain from about 3 to about 30 weight percent of water based on total corn cob weight.

14. The process of claim 13 wherein the finely divided corn cobs are present in an amount of from about 1 to about 15 weight percent based on total weight of the alkenyl aromatic polymeric material.

15. The process of claim 1 wherein the alkenyl aromatic polymeric foam body has a density of about 1 to about 5 pounds per cubic foot.

16. The process of claim 1 wherein an amount of water is added to the heat plastified polymeric material.

17. The process of claim 1 wherein the water-containing organic vegetable matter is present in the alkenyl aromatic polymeric material in an amount sufficient to act as an extrusion aid.

* * * * *